United States Patent
Choi et al.

(10) Patent No.: US 8,326,348 B2
(45) Date of Patent: Dec. 4, 2012

(54) APPARATUS AND METHOD FOR SAVING POWER IN DUAL MODE PORTABLE TERMINAL

(75) Inventors: Jong-Mu Choi, Gunpo-si (KR);
Jun-Yeop Jung, Suwon-si (KR);
Mi-Soon Kim, Yongin-si (KR);
Hee-Jung Chae, Suwon-si (KR);
Jung-Hun Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1080 days.

(21) Appl. No.: 12/013,728

(22) Filed: Jan. 14, 2008

(65) Prior Publication Data
US 2008/0171568 A1 Jul. 17, 2008

(30) Foreign Application Priority Data
Jan. 12, 2007 (KR) .................. 10-2007-0003788

(51) Int. Cl.
*H04B 1/38* (2006.01)
*H04M 1/00* (2006.01)
(52) U.S. Cl. .................................. 455/552.1; 455/574
(58) Field of Classification Search .............. 455/556.1, 455/552.1, 572, 574
See application file for complete search history.

(56) References Cited

U.S. PATENT DOCUMENTS

| | | | |
|---|---|---|---|
| 6,067,460 A | 5/2000 | Alanara et al. | |
| 6,580,700 B1 | 6/2003 | Pinard et al. | |
| 6,978,149 B1 * | 12/2005 | Morelli et al. | 455/522 |
| 7,206,609 B2 * | 4/2007 | Lin et al. | 455/562.1 |
| 7,440,781 B2 * | 10/2008 | Beach et al. | 455/574 |
| 7,676,198 B2 * | 3/2010 | Mahany | 455/69 |
| 2007/0077893 A1 * | 4/2007 | Sasao | 455/73 |
| 2007/0123209 A1 * | 5/2007 | Sasao | 455/404.2 |
| 2008/0161072 A1 * | 7/2008 | Lide et al. | 455/574 |

FOREIGN PATENT DOCUMENTS

| | | | |
|---|---|---|---|
| EP | 1 496 719 | | 1/2005 |
| EP | 1 768 431 | | 3/2007 |
| EP | 1768431 | * | 3/2007 |
| KR | 1020010001752 | | 1/2001 |
| KR | 1020010021100 | | 3/2001 |
| KR | 1020060038687 | | 5/2006 |
| KR | 100653196 | | 11/2006 |

\* cited by examiner

*Primary Examiner* — Blane J Jackson
(74) *Attorney, Agent, or Firm* — The Farrell Law Firm, P.C.

(57) ABSTRACT

Provided is an apparatus and method for saving power in a dual mode portable terminal that concurrently supports a cellular network and an unlicensed band network. The method includes, upon disassociating from an in-association Access Point (AP) of an unlicensed band network, measuring a Received Signal Strength Indicator (RSSI) from the AP during a predetermined time and calculating an average value of the RSSI; and comparing the calculated average value with a predetermined threshold value and deciding whether to perform a mode conversion between a low power mode and a general mode.

13 Claims, 3 Drawing Sheets

APPARATUS AND METHOD FOR SAVING POWER IN DUAL MODE PORTABLE TERMINAL

PRIORITY

This application claims priority under 35 U.S.C. §119(a) to an application filed in the Korean Intellectual Property Office on Jan. 12, 2007 and assigned Serial No. 2007-3788, the contents of which are incorporated herein by reference.

BACKGROUND OF THE INVENTION

1. Field of the Invention

The present invention relates generally to an apparatus and method for saving power in a dual mode portable terminal, and in particular, to an apparatus and method for saving power of an unlicensed band network supporting module in a dual mode portable terminal that concurrently supports a cellular network and the unlicensed band network. The unlicensed band network refers to a network using an unlicensed Industrial, Science, and Medical (ISM) radio frequency band. For example, there are Wireless Fidelity (WiFi), IEEE 802.11, HIgh PErformance Radio Local Area Network (HIPERLAN), Bluetooth® (hereinafter, "Bluetooth"), IEEE 802.15.4, Ulta-WideBand (UWB), etc.

2. Description of the Related Art

Portable terminals supporting a handover between a cellular network and an unlicensed band network and moving and communicating between the cellular network and the unlicensed band network in all voice and data sessions are being currently provided.

Portable terminals supporting both a cellular network and an unlicensed band network periodically search a wireless base station (or an Access Point (AP)) of a neighbor unlicensed band network in an idle state and associate with an AP having an optimal condition. Alternately, the portable terminals associate with an AP selected by a user and attempt to access the unlicensed band network. The portable terminals disassociate from the AP automatically when a Received Signal Strength Indicator (RSSI) from the AP falls below a predetermined threshold value.

FIG. 1 is a flowchart illustrating a mode conversion procedure for saving power in a dual mode portable terminal according to the conventional art. For example, a portable terminal supporting a WiFi network that is an unlicensed band network and a cellular network will be described.

Referring to FIG. 1, in Step 101, the portable terminal checks whether the portable terminal associates with a specific AP and accesses the WiFi network. If so, in Step 103, the portable terminal measures a Received Signal Strength Indicator (RSSI) from the AP. In Step 105, the portable terminal compares the measured RSSI with a threshold value for disassociating from the AP. When the measured RSSI is greater than the threshold value for disassociating from the AP, the portable terminal returns to the Step 103 and again periodically measures the RSSI from the AP and performs subsequent steps.

In Step 107, the portable terminal disassociates from the AP when the measured RSSI is less than or equal to the threshold value for disassociating from the AP. In Step 109, the portable terminal performs a state transition to a low power mode. In the low power mode, after turning OFF, a WiFi module (e.g., a WiFi chip) supporting the WiFi network turns ON at every time interval and receives a signal from the WiFi network. After that, a procedure according to the conventional art is terminated.

As described above, the conventional portable terminal performs a state transition to a low power mode and saves power of the portable terminal, when disassociating from an AP because RSSI from an AP that is currently in association falls below a predetermined threshold value. The portable terminal again associates with an AP and converts the low power mode into a general mode, when the RSSI is greater than the predetermined threshold value.

Accordingly, if an RSSI from an AP that is currently associated with the portable terminal temporarily falls below the predetermined threshold value and again increases higher than the predetermined threshold value because of a change of radio wave, the conventional portable terminal repeatedly performs the state transition between the low power mode and the general mode.

However, the portable terminal temporarily consumes a large amount of power when performing a state transition from a low power mode to a general mode or a state transition from a general mode to a low power mode. For example, during a one-time state transition, the portable terminal consumes as much as power as the portable terminal consumes during approximately 500 ms in a general mode. Accordingly, the conventional portable terminal has a drawback that when RSSI from an AP varies because of a change of radio wave, an unnecessary state transition is repeatedly performed and thus power is wasted.

SUMMARY OF THE INVENTION

An aspect of the present invention is to substantially solve at least the above problems and/or disadvantages and to provide at least the advantages below. Accordingly, an aspect of the present invention is to provide an apparatus and method for saving power in a dual mode portable terminal that concurrently supports a cellular network and an unlicensed band network.

Another aspect of the present invention is to provide a mode conversion apparatus and method for saving power of an unlicensed band network supporting module in a dual mode portable terminal that concurrently supports a cellular network and an unlicensed band network.

A further aspect of the present invention is to provide an apparatus and method for saving power using an average value of an RSSI from an unlicensed band network in a dual mode portable terminal that concurrently supports a cellular network and the unlicensed band network.

The above aspects are achieved by providing an apparatus and method for saving power in a dual mode portable terminal.

According to one aspect of the present invention, there is provided a method for saving power in a dual mode portable terminal that concurrently supports a cellular network and an unlicensed band network. The method includes, upon disassociating from an in-association Access Point (AP) of an unlicensed band network, measuring an RSSI from the AP during a predetermined time and calculating an average value of the RSSI; and comparing the calculated average value with a predetermined threshold value and deciding whether to perform a mode conversion between a low power mode and a general mode.

According to another aspect of the present invention, there is provided an apparatus for saving power in a dual mode portable terminal that concurrently supports a cellular network and an unlicensed band network. The apparatus includes a controller and a communication module. Upon disassociating from an in-association AP of the unlicensed band network, the controller measures RSSI from the AP during a predetermined time, compares the calculated average value with a predetermined threshold value, and decides whether to perform a mode conversion. The communication module performs a mode conversion between a low power mode and a general mode depending on the decision of the controller.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

An apparatus and method for saving power using an average value of an RSSI from an unlicensed band network in a dual mode portable terminal concurrently supporting a cellular network and the unlicensed band network according to the present invention will be described below. The unlicensed band network refers to a network using an unlicensed ISM radio frequency band. For example, there are WiFi, IEEE 802.11, HIPERLAN, Bluetooth, IEEE 802.15.4, UWB, etc. The present invention is applicable to all unlicensed band networks. As an example, a WiFi network will be described below.

Figure 1:
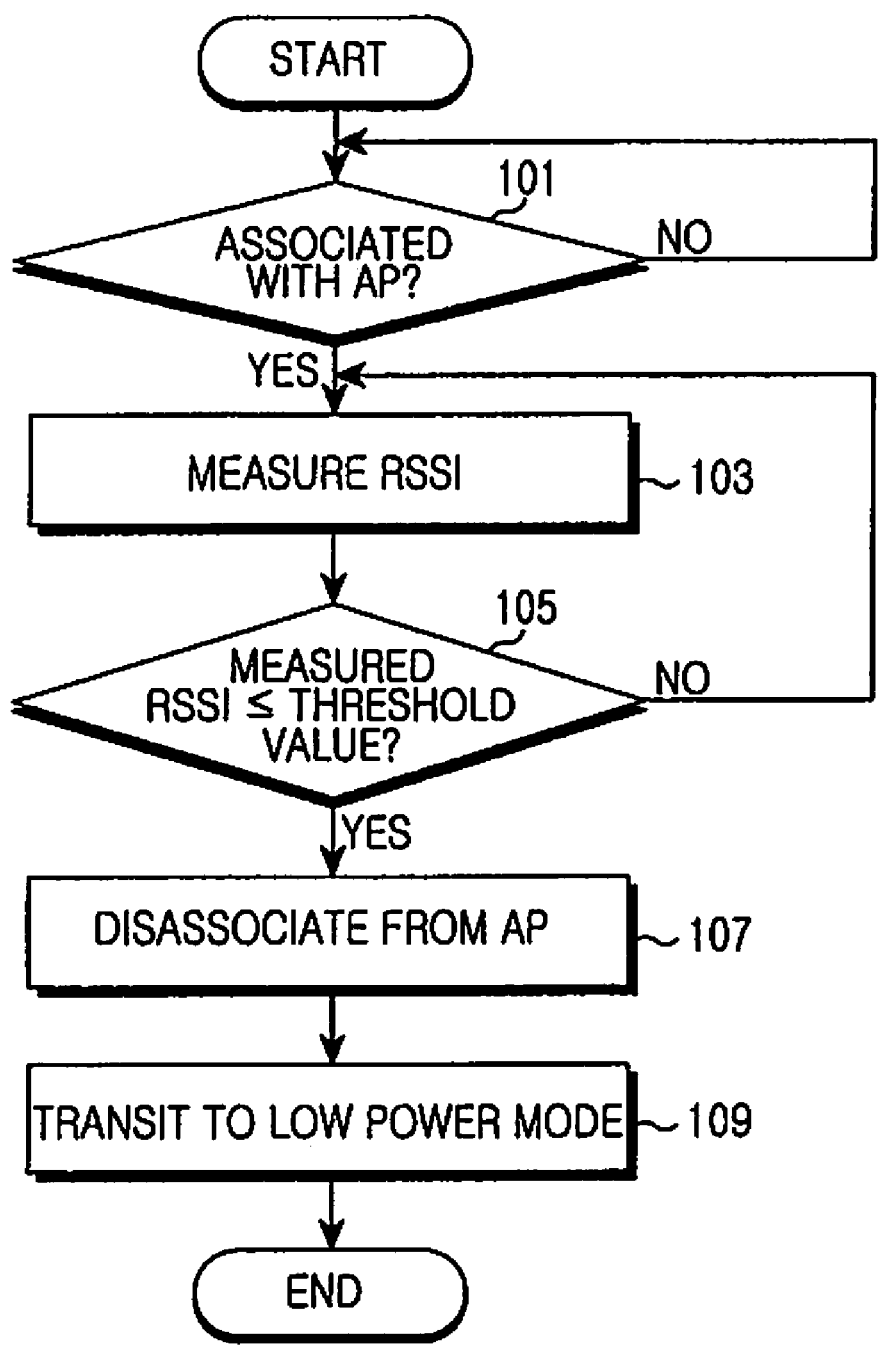
FIG. 1 is a flowchart illustrating a mode conversion procedure for saving power in a dual mode portable terminal according to the conventional art.
Figure 2:
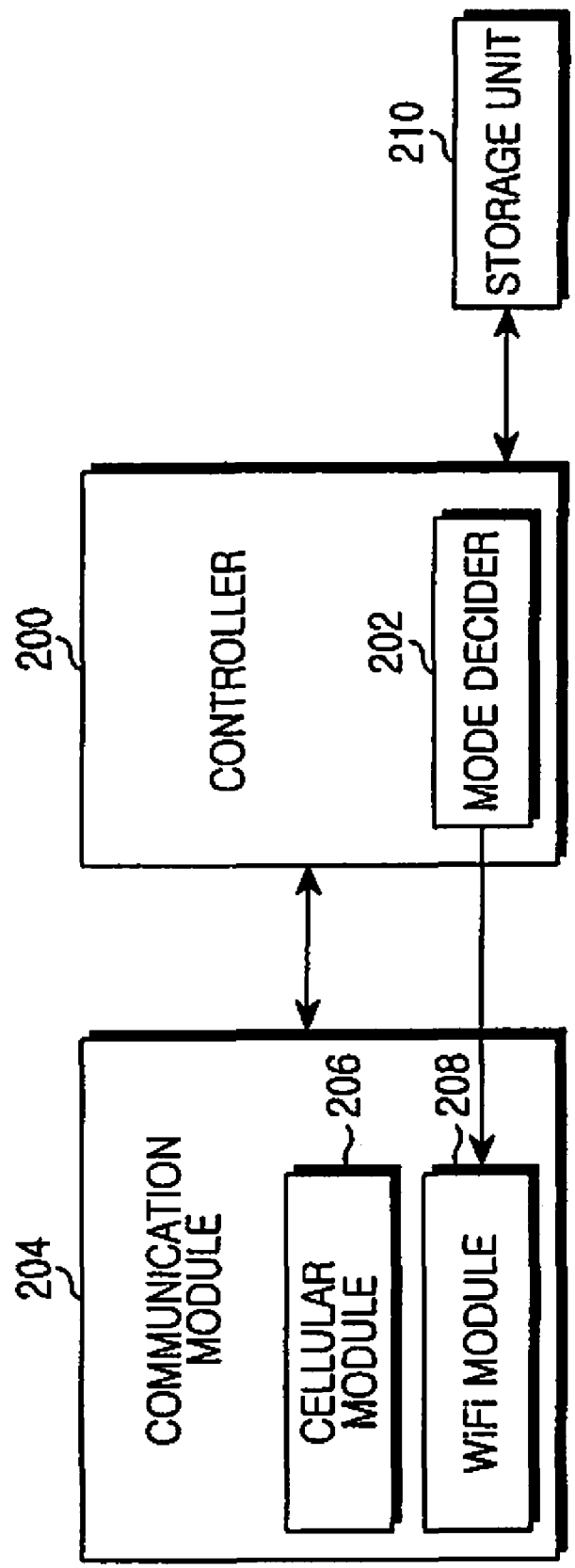
FIG. 2 is a block diagram illustrating a dual mode portable terminal according to the present invention.

FIG. 2 is a block diagram illustrating a dual mode portable terminal according to the present invention. The portable terminal includes a controller 200, a communication module 204, and a storage unit 210. The controller 200 includes a mode decider 202. The communication module 204 includes a cellular module 206 and a WiFi module 208.

Referring to FIG. 2, the controller 200 controls and processes a general operation of the portable terminal. The controller 200 measures an RSSI from an AP that is currently in association, compares the measured RSSI with a predetermined threshold value for disassociating from the AP, determines whether the controller 200 disassociates from the AP that is currently in association, and processes and controls a function for disassociation. In particular, the controller 200 includes the mode decider 202 according to the present invention. Thus, upon disassociating from the AP, the controller 200 decides whether the controller 200 performs a state transition to a low power mode for saving power and outputs a result of the decision to the communication module 204.

Upon disassociating from the AP, the mode decider 202 measures the RSSI from the AP during a preset time, calculates an average value of the measured RSSI, compares the calculated average value with a predetermined threshold value for disassociation, and decides whether the mode decider 202 performs a state transition to a low power mode or maintains a general mode. The mode decider 202 can decide to perform the state transition to the low power mode when the calculated average value is less than or equal to a predetermined threshold value. The mode decider 202 can decide to perform a procedure of associating with the AP, and maintain the general mode. The low power mode represents a mode in which, after turning OFF, the WiFi module 208 supporting a WiFi network in the portable terminal turns ON at every time interval and receives a signal from an AP of the WiFi network, thereby saving power consumed by the WiFi module 208. The general mode represents a mode in which the WiFi module 208 maintains an ON state.

The communication module 204 includes the cellular module 206 and the WiFi module 208. Under the control of the controller 200, the communication module 204 processes a signal exchanged with a cellular network and a WiFi network. Specifically, the communication module 204 receives information on whether the portable terminal operates in a low power mode or operates in a general mode from the mode decider 202 included in the controller 200. The communication module 204 performs a function for operating in the low power mode or the general mode. In other words, when the communication module 204 receives a signal informing the communication module 204 of the low power mode from the controller 200, the communication module 204 periodically turns the WiFi module 208 ON/OFF and receives a signal from the AP of the WiFi network at a predetermined time interval. When the communication module 204 receives a signal for informing the communication module 204 of the general mode from the controller 200, the communication module 204 maintains an ON state of the WiFi module 208 and continues receiving a signal from the AP.

The storage unit 210 stores a variety of programs for processing a general operation of the portable terminal, a micro code, updateable data, etc. Specifically, the storage unit 210 stores a predetermined threshold value for disassociating from the AP.

Figure 3:
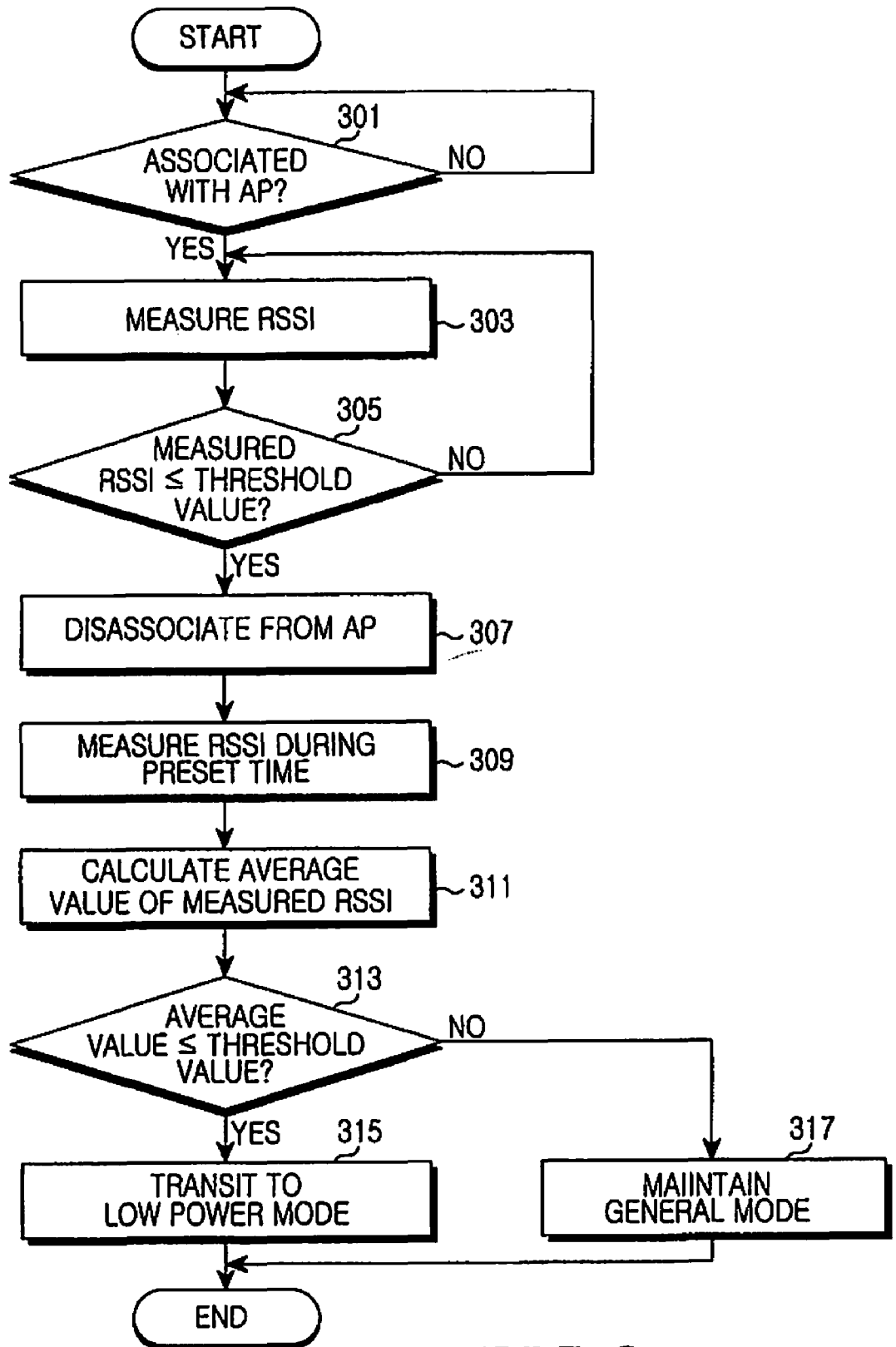
FIG. 3 is a flowchart illustrating a mode conversion procedure for saving power in a dual mode portable terminal according to the present invention.

FIG. 3 is a flowchart illustrating a mode conversion procedure for saving power in a dual mode portable terminal according to the present invention.

Referring to FIG. 3, in Step 301, the portable terminal checks whether the portable terminal associates with a specific AP and accesses a WiFi network. If so, in Step 303, the portable terminal measures an RSSI from the AP. In Step 305, the portable terminal compares the measured RSSI with a threshold value for disassociating from the AP.

When the measured RSSI is greater than the threshold value for the disassociation, the portable terminal returns to the Step 303 and periodically measures the RSSI from the AP and again performs subsequent steps.

When the measured RSSI is less than or equal to the threshold value for disassociating from the AP, in Step 307, the portable terminal disassociates from the AP and performs a handover from the WiFi network to a cellular network.

In Step 309, the portable terminal measures the RSSI from the AP during a preset time. In Step 311, the portable terminal calculates an average value of the measured RSSI. The time for measuring RSSI from the AP can be set differently according to a performance of the WiFi module 208 supporting the WiFi network.

In Step 313, the portable terminal again compares the calculated average value with the predetermined threshold value for disassociating from the AP. When the calculated average value is less than or equal to the predetermined threshold value for disassociating from the AP, in Step 315, the portable terminal performs a state transition to a low power mode to save power of a module supporting the WiFi network. Next, a procedure according to the present invention is terminated. The low power mode refers to a mode in which the WiFi module 208 periodically turns ON/OFF and receives a signal from the WiFi network at a predetermined time interval, thereby saving power.

When the calculated average value is greater than the predetermined threshold value for disassociating from the AP, in Step 317, the portable terminal maintains a general mode that is a current mode and associates with the AP. The general mode refers to a mode in which the WiFi module 208 maintains an ON state and continues receiving a signal from the WiFi network.

Next, the portable terminal terminates a procedure according to the present invention.

As described above, the present invention has an effect of preventing a repeated mode conversion caused by a phenomenon of a frequently changing radio wave signal and saving power unnecessarily consumed due to the mode conversion, by deciding to perform a mode conversion between a low power mode and a general mode using an average value of an RSSI from an unlicensed band network in a dual mode portable terminal that concurrently supports a cellular network and the unlicensed band network.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for saving power in a dual mode portable terminal that concurrently supports a cellular network and an unlicensed band network, the method comprising:
   disassociating from an in-association Access Point (AP) of an unlicensed band network;
   measuring a Received Signal Strength Indicator (RSSI) from the disassociated AP from a time when the dual mode portable terminal disassociates from the in-association AP to a predetermined time;
   calculating an average value of the RSSI; and
   comparing the calculated average value with a predetermined threshold value and deciding whether to perform a mode conversion between a low power mode and a general mode.

2. The method of claim 1, further comprising converting into the low power mode when the calculated average value is less than or equal to the predetermined threshold value.

3. The method of claim 1, further comprising maintaining the general mode when the calculated average value is greater than the predetermined threshold value.

4. The method of claim 1, wherein the predetermined threshold value is a threshold value for determining whether to disassociate from the AP.

5. An apparatus for saving power in a dual mode portable terminal that concurrently supports a cellular network and an unlicensed band network, the apparatus comprising:
   a controller for, disassociating from an in-association AP of the unlicensed band network, measuring an RSSI from the disassociated AP from a time when the dual mode portable terminal disassociates from the in-association AP to a predetermined time, comparing a calculated average value with a predetermined threshold value, and deciding whether to perform a mode conversion; and
   a communication module for performing a mode conversion between a low power mode and a general mode depending on the decision of the controller.

6. The apparatus of claim 5, wherein the controller decides to convert into a low power mode when the average value is less than or equal to the predetermined threshold value and decides to maintain a general mode when the average value is greater than the predetermined threshold value.

7. The apparatus of claim 5, wherein the predetermined threshold value is a threshold value for determining whether to disassociate from the AP.

8. The apparatus of claim 5, wherein the communication module comprises:
   a cellular module for processing a signal exchanged with the cellular network; and
   an unlicensed band network supporting module for processing a signal exchanged with the unlicensed band network,
   wherein when the controller decides to perform a mode conversion into the low power mode, the controller periodically turns the unlicensed band network supporting module on or off.

9. A method for saving power in a portable terminal, the method comprising:
   a means for disassociating from an in-association Access Point (AP) of an unlicensed band network
   measuring a Received Signal Strength Indicator (RSSI) from the disassociated AP; and
   comparing an average value of the RSSI with a threshold value and deciding whether to perform a mode conversion between a low power mode and a general mode.

10. The method of claim 9, further comprising converting into the low power mode when the average value is less than or equal to the threshold value.

11. The method of claim 9, further comprising maintaining the general mode when the average value is greater than the threshold value.

12. The method of claim 9, wherein the threshold value is a value for determining whether to disassociate from the AP.

13. An apparatus for saving power in a portable terminal, the apparatus comprising:
   a means for disassociating from an in-association Access Point (AP) of an unlicensed band network;
   a means for measuring a Received Signal Strength Indicator (RSSI) from the disassociated Access Point (AP); and
   a means for comparing an average value of the RSSI with a threshold value and deciding whether to perform a mode conversion between a low power mode and a general mode.

* * * * *